(12) United States Patent
Kim et al.

(10) Patent No.: US 7,655,349 B2
(45) Date of Patent: Feb. 2, 2010

(54) CYLINDRICAL LITHIUM SECONDARY BATTERY

(75) Inventors: Jong Ku Kim, Yongin-si (KR); Soon Ki Woo, Yongin-si (KR); Jin Wook Kim, Yongin-si (KR); Youn Han Chang, Yongin-si (KR); Sang Bong Nam, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 626 days.

(21) Appl. No.: 11/409,031

(22) Filed: Apr. 24, 2006

(65) Prior Publication Data

US 2006/0263673 A1    Nov. 23, 2006

(30) Foreign Application Priority Data

Apr. 27, 2005    (KR) .................... 10-2005-0035301
May 18, 2005    (KR) .................... 10-2005-0041422

(51) Int. Cl.
*H01M 2/10*    (2006.01)
*H01M 4/02*    (2006.01)

(52) U.S. Cl. ..................................... 429/94; 429/186
(58) Field of Classification Search ................ 429/94, 429/163, 186
See application file for complete search history.

(56) References Cited

U.S. PATENT DOCUMENTS

| 3,796,606 | A | * | 3/1974 | Lehmann et al. ............. 429/94 |
| 5,047,068 | A | | 9/1991 | Stoklosa |
| 5,882,815 | A | | 3/1999 | Tagawa |
| 6,020,084 | A | * | 2/2000 | Romero et al. ............... 429/94 |
| 2003/0148175 | A1 | | 8/2003 | Iwanaga et al. |
| 2003/0198863 | A1 | | 10/2003 | Murashige et al. |

(Continued)

FOREIGN PATENT DOCUMENTS

EP    0872909    10/1998

(Continued)

OTHER PUBLICATIONS

European Search Report issued in corresponding European Patent Application No. 06113177.7 dated Jun. 6, 2006.

*Primary Examiner*—Stephen J. Kalafut
(74) *Attorney, Agent, or Firm*—Stein McEwen, LLP

(57) ABSTRACT

A cylindrical lithium secondary battery includes an electrode assembly which has a first electrode plate, a second electrode plate, and a separator provided between the first electrode plate and the second electrode plate, is wound in a spiral shape, and has a central space at the center of winding; a core member which is inserted into the central space of the electrode assembly; a case having a space for containing the electrode assembly; and a cap assembly which is connected to an upper portion of the case so as to seal the case. The core member is formed in a tube shape having a gap along a longitudinal direction, which divides the core member into a body portion and left and right lateral end portions, wherein an imaginary arc line extending from an outer circumferential surface of the body portion of the core member defines an imaginary circumference, and wherein the left and right lateral end portions are located inside the imaginary circumference and comprise a pair of first bending portions, inwardly bending and symmetrically disposed with respect to the gap, and a pair of second bending portions bending in a rotation direction that is opposite to the inwardly bending rotational directions of the first bending portions.

27 Claims, 13 Drawing Sheets

U.S. PATENT DOCUMENTS

2006/0257735 A1 * 11/2006 Kim .................. 429/94 X

FOREIGN PATENT DOCUMENTS

| | | |
|---|---|---|
| EP | 1139458 | 10/2001 |
| JP | 4-332481 | 11/1992 |
| JP | 8-255631 | 10/1996 |
| JP | 8-264206 | 10/1996 |
| JP | 162801 | 6/1998 |
| JP | 2001-283984 | 10/2001 |
| KR | 2003-43745 | 6/2003 |

* cited by examiner

CYLINDRICAL LITHIUM SECONDARY BATTERY

CROSS-REFERENCE TO RELATED APPLICATION

This application claims the benefit of Korean Patent Application No. 2005-35301, filed on Apr. 27, 2005, in the Korean Intellectual Property Office, and of Korean Patent Application No. 2005-41422, filed on May 18, 2005 in the Korean Intellectual Property Office, the disclosures of which are incorporated herein in their entirety by reference.

BACKGROUND OF THE INVENTION

1. Field of the Invention

Aspects of the present invention relate to a cylindrical lithium ion secondary battery, and more particularly, to a cylindrical lithium ion secondary battery having an improved stability with respect to external pressure.

2. Description of the Related Art

In general, a cylindrical lithium ion secondary battery includes an electrode assembly that is wound substantially in the form of a cylinder, a cylindrical can that is connected to the electrode assembly, an electrolytic solution that is infused inside the can to allow lithium ions to move, and a cap assembly that is connected to one side of the can and prevents the electrolytic solution from leaking and prevents the electrode assembly from separating.

The cylindrical lithium ion secondary battery typically has a capacity of approximately 2000~2400 mA, and thus is mainly used in electronic devices requiring high power such as notebook PCs, digital cameras, or camcorders. For example, a required number of cylindrical lithium ion secondary batteries may be connected in series or parallel, may include a protection circuit, and may be assembled in a specific shape in a hard pack to be used as a power source connected to an electronic device.

The cylindrical lithium ion secondary battery is manufactured by the following method.

First, a negative electrode plate that includes an active material and a positive electrode plate that includes a separator and the active material are laminated together. One end thereof is then connected to a pole-shaped wind-axis, and is then wound in a substantial cylindrical shape, thereby forming an electrode assembly. Thereafter, the electrode assembly is inserted into a cylindrical can, an electrolytic solution is then infused therein, and a cap assembly is welded at an upper portion of the cylindrical can, thereby forming a lithium ion secondary battery having a substantial cylindrical shape.

Recently, a core member 100 having a substantial pole shape as shown in FIG. 1 has been inserted in the center of the electrode assembly, so that the electrode assembly is not deformed when the cylindrical lithium ion secondary battery is charged or discharged. The core member 100 is generally formed by winding a material that initially has a form of a plate, so that a tube shape having a circular cross-section is formed. A portion thereof is cut along a longitudinal direction.

However, in the cylindrical lithium ion secondary battery above, the core member 100 may move due to an external impact such as a drop. The movement of the core member 100 may affect the cap assembly located at an upper portion of the core member 100. In particular, when the core member 100 collides with a safety belt of the cap assembly, the safety belt may be inverted or damaged. If the safety belt is inverted or damaged, it may severely affect a safety of a lithium secondary battery.

Further, when the core member 100 rotates, a lower end of the electrode assembly may come in contact with the core member 100, and thus a short may occur at the lower end of the electrode assembly.

Furthermore, when the core member 100 is deformed or damaged, the separator of the electrode assembly may be damaged, and the damage to the separator may lead to a short between the positive electrode plate and the negative electrode plate, which may produce even greater damage or an explosion of the cylindrical lithium ion secondary battery. In particular, when external pressure is applied, the core member 100 may be deformed in a specific direction at a point where the external pressure is concentrated. The electrode assembly receives the pressure in the specific direction, thereby producing a short between the electrode plates.

SUMMARY OF THE INVENTION

Aspects of the present invention provide a cylindrical lithium ion secondary battery having an improved safety with respect to an external pressure.

According to an aspect of the present invention, there is provided a cylindrical lithium secondary battery comprising: an electrode assembly which has a first electrode plate, a second electrode plate, and a separator provided between the first electrode plate and the second electrode plate, is wound in a spiral shape, and has a specific, central space at the center of winding; a core member which is inserted into a central space of the electrode assembly; a case having a space for containing the electrode assembly; and a cap assembly which is connected to an upper, open end portion of the case so as to seal the case, wherein the core member is formed in a tubular shape having a gap along a longitudinal direction, which divides the core member into a body portion and left and right lateral end portions by a pair of first bending portions symmetrically disposed with respect to the gap.

According to another aspect of the present invention, there is provided a cylindrical lithium secondary battery comprising: an electrode assembly, such as, for example, a jelly-roll type electrode assembly; a core member which is formed in a tubular shape having a cut-groove along a longitudinal direction, and includes at least one notch formed at an inner lateral circumferential surface of the tube shape in a longitudinal direction; a case which has a space for containing the electrode assembly; and a cap assembly which is connected to an upper, open portion of the case so as to seal the case.

According to an aspect of the present invention, two or four notches may be formed in a symmetrical manner with respect to the cut-groove, and when the four notches are formed, imaginary lines connecting each adjacent notch may form a trapezoid According to another aspect of the present invention, there is provided a cylindrical lithium secondary battery comprising: an electrode assembly, such as, for example, a jelly-roll type electrode assembly; a core member which is formed in a tubular shape having a gap along a longitudinal direction, is divided into a body portion and left and right lateral end portions through a pair of first bending portions symmetrically disposed with respect to the gap, and is inserted into a central space of the electrode assembly; a case having a space for containing the electrode assembly; and a cap assembly which is connected to an upper, open portion of the case so as to seal the case, wherein an imaginary arc line extending from the body portion of the core member forms an imaginary circumference, and the left and right lateral end portions are located inside the imaginary circumference by the first bending portions, and are respectively overlapped through a pair of second bending portions.

According to an aspect of the present invention, the second bending portions may be bent in a rotation direction equal to or opposite to those of the first bending portions, and edges curved through the second bending portions may be bent again through third bending portions in a rotation direction equal to or opposite to those of the second bending portions.

According to an aspect of the present invention, the edges of the left and right lateral end portions may be located on an imaginary arc line extending from an outer circumferential surface of the body portion, and imaginary lines extending inwardly from each of the second bending portions of the left and right lateral end portions pass through an axis of the core member and may form an angle equal to or less than 120° with respect to each other.

According to another aspect of the present invention, there is provided a cylindrical lithium secondary battery comprising: an electrode assembly, such as, for example, a jelly-roll type electrode assembly, a core member which is formed in a tubular shape having a slot in the middle portion along a longitudinal direction; a case which has a space for containing the electrode assembly and has upper, open portion; and a cap assembly which is connected to the open portion of the case so as to seal the case.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
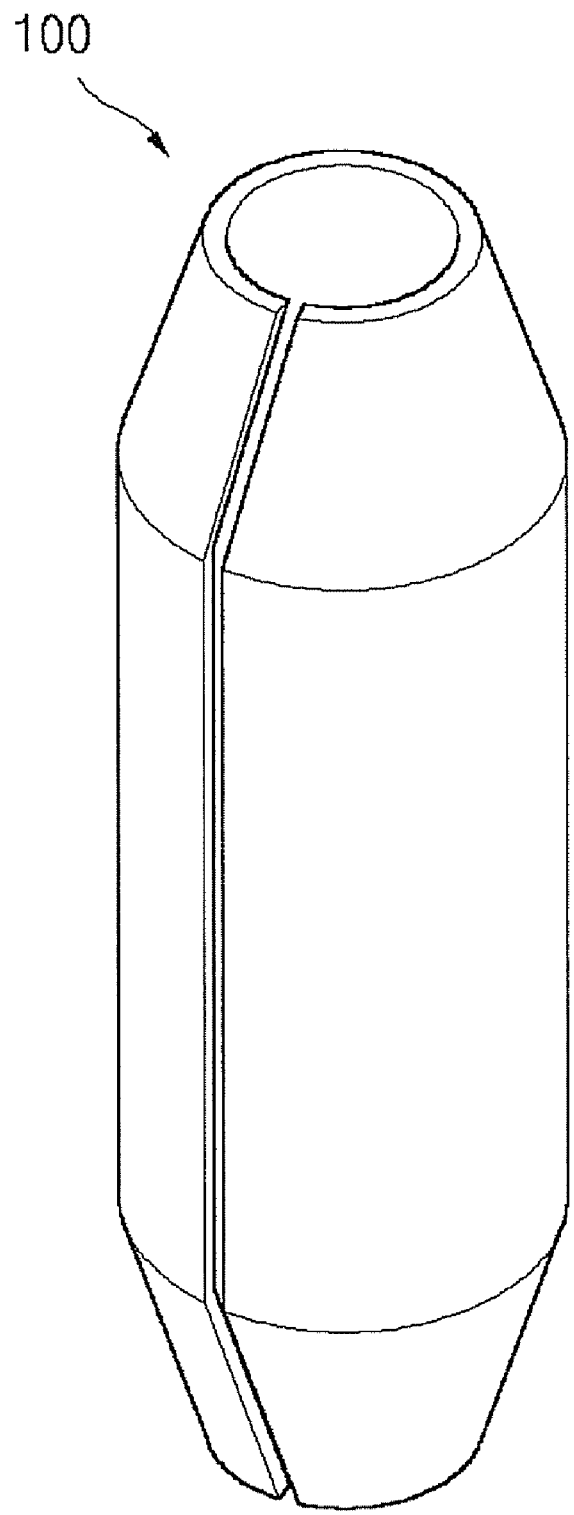
FIG. 1 is a perspective view of a conventional core member.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2A:
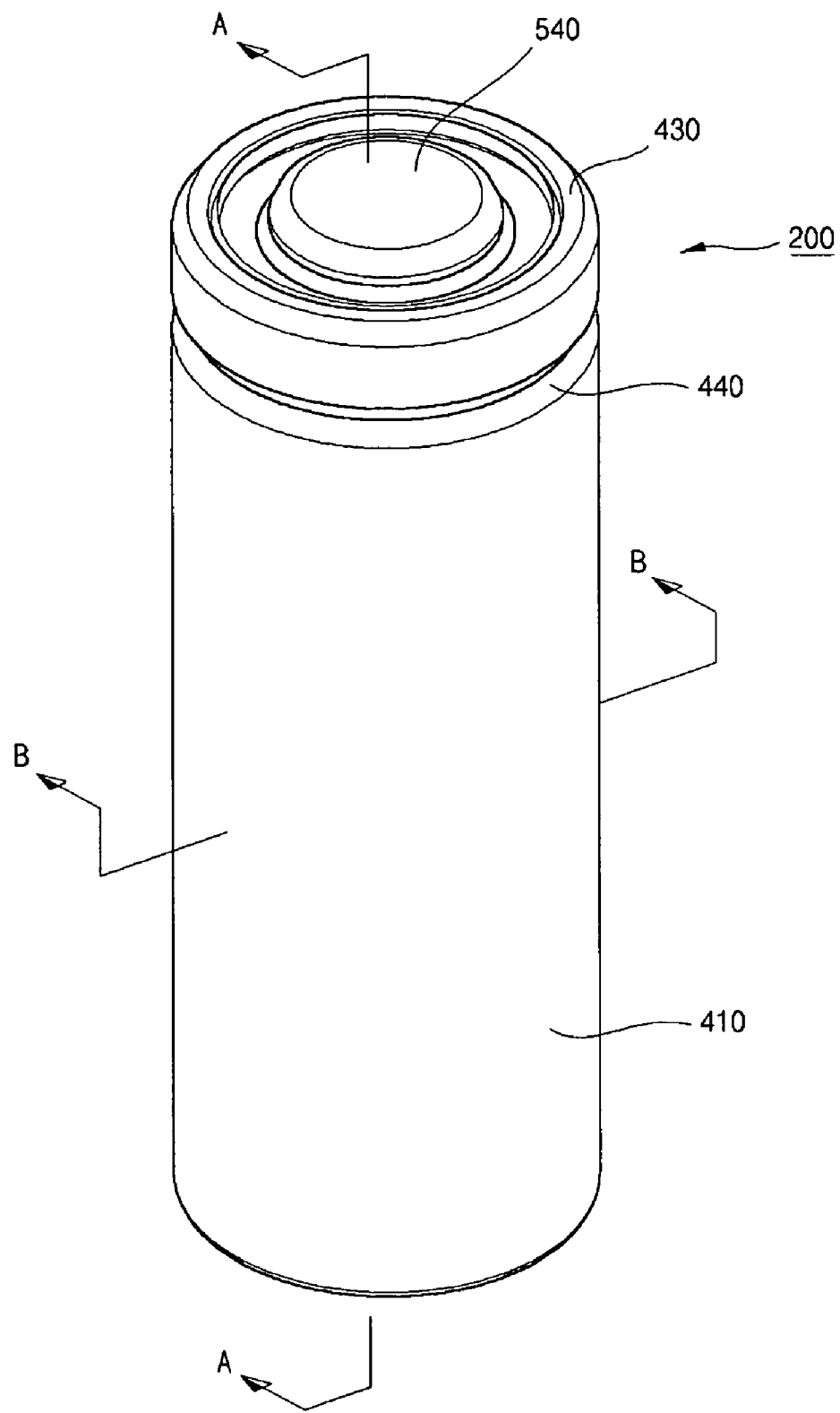
FIG. 2A is a perspective view of a cylindrical lithium secondary battery according to an embodiment of the present invention.
Figure 2B:
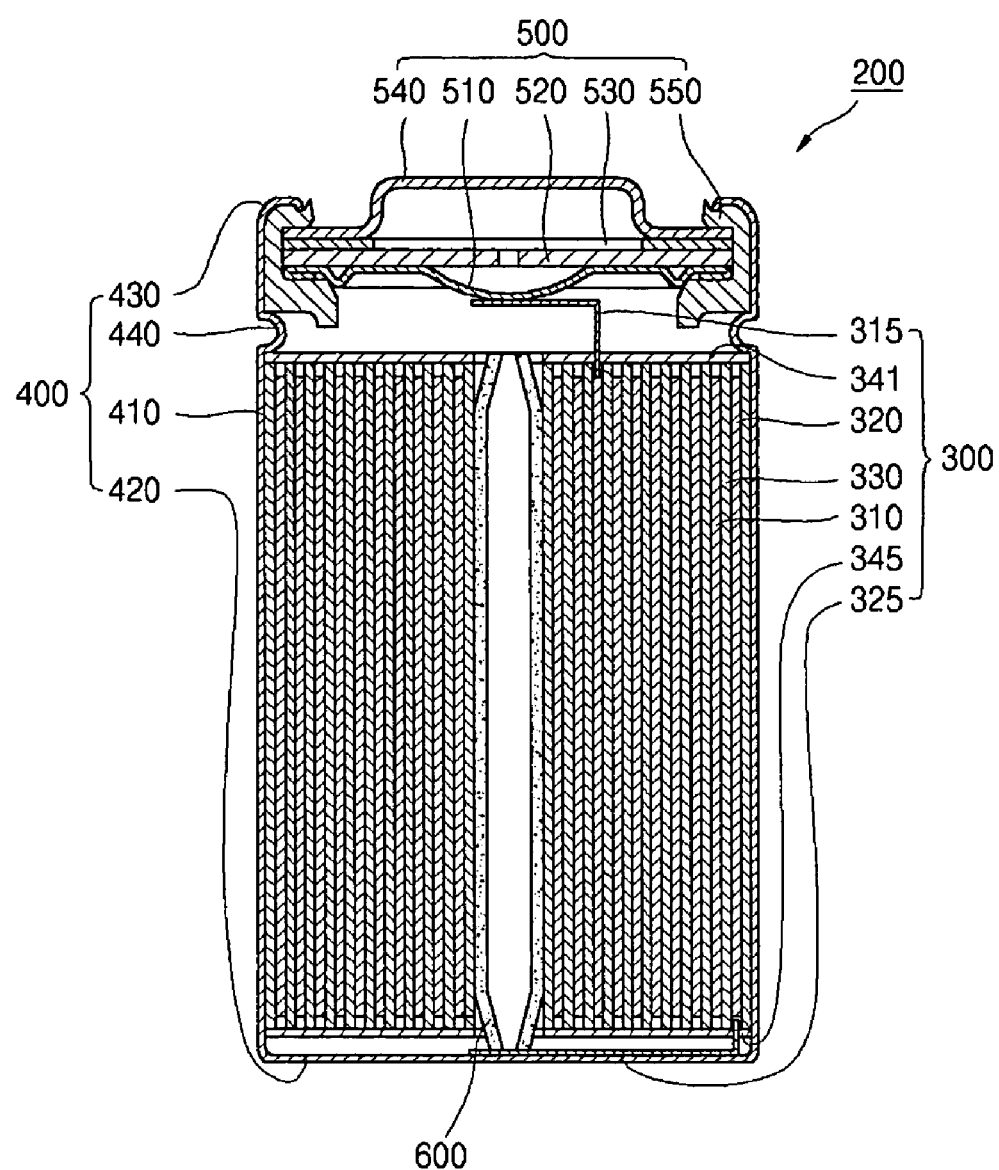
FIG. 2B is a cross-sectional view along the A-A line of FIG. 2A.
Figure 2C:
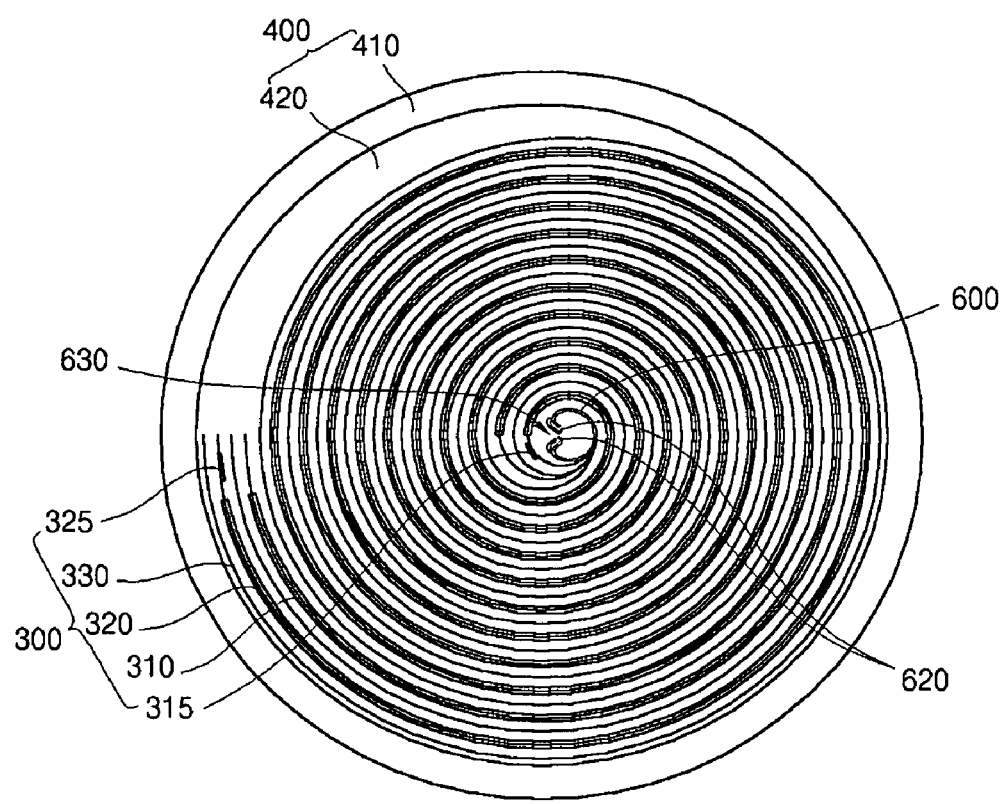
FIG. 2C is a cross-sectional view along the B-B line of FIG. 2A.

FIG. 2A is a perspective view of a cylindrical lithium secondary battery according to an embodiment of the present invention. FIG. 2B is a cross-sectional view along the A-A line of FIG. 2A. FIG. 2C is a cross-sectional view along the B-B line of FIG. 2A.

Referring to FIGS. 2A to 2C, a cylindrical lithium ion secondary battery 200 includes an electrode assembly 300 which generates a voltage difference at charging/discharging time, a cylindrical case 400 which contains the electrode assembly 300, a cap assembly 500 which is assembled at an upper portion of the cylindrical case 400 and prevents the electrode assembly 300 from separation, and a core member 600 which is located at a central space of the electrode assembly 300.

The electrode assembly 300 includes a positive (or negative) active material, such as, for example, a first electrode plate 310 coated with the positive active material, and a negative (or positive) active material, such as, for example, a second electrode plate 320 coated with the negative active material. In addition, a separator 330 is located between the first electrode plate 310 and the second electrode plate 320. The separator 330 prevents the first and second electrode plates 310 and 320 from shorting and allows only lithium ions to move. Further, the first electrode plate 310, the second electrode plate 320, and the separator 330 are wound in a spiral shape, have a specific space at the center of winding, and are contained in the cylindrical case 400. The first electrode plate 310 is generally made of aluminum (Al), and is bonded with a first electrode tab 315 that protrudes upwards in a specific length. The second electrode plate 320 is generally made of nickel (Ni), and is bonded with a second electrode tab 325 that protrudes downwards in a specific length. However, the present invention is not limited thereto. Moreover, upper and lower isolating plates 341 and 345 are further included at upper and lower portions of the electrode assembly 300, respectively, in order to avoid a direct contact with a cap assembly 500 or the cylindrical case 400.

In the cylindrical case 400, a cylindrical surface 410 defines a specific space with a specific diameter. A bottom surface 420 is formed at a lower portion of the cylindrical surface 410 to block a lower space of the cylindrical surface 410, and an upper portion of the cylindrical surface 410 is open so that the electrode assembly 300 can be inserted. Either the first electrode tab 315 of the electrode plate 310 or the second electrode tab 325 of the second electrode plate 320 is bonded at the center of the bottom surface 420 of the cylindrical case 400, and thus, the cylindrical case 400 itself functions as an extension of the first electrode plate 310 or second electrode plate 320. For example, the second electrode tab 325 may be bonded at the center of the bottom surface 420 of the cylindrical case 400 so that the cylindrical case functions as part of the negative electrode. The cylindrical case 400 is generally made of aluminum (Al), steel (Fe), or an alloy of Al and Fe. Further, in the upper portion of the cylindrical case 400, a crimping portion 430 is curved in one direction so as to press the cap assembly 500, and a beading portion 440 is concaved inwards to press the cap assembly 500 from bottom to top.

The cap assembly 500 includes a conductive safety belt 510 which is welded to the first electrode tab 315 and which is inverted in the case of over-charging or abnormal heating, a printed circuit board (PCB) 520 which is electrically or mechanically connected to an upper portion of the safety belt 510 and cuts a circuit when the safety belt 510 is inverted, a positive temperature element 530 which is electrically and mechanically connected to an upper portion of the PCB 520 and cuts a circuit at a specific temperature and a higher temperature, a conductive electrode cap 540 which is electrically and mechanically connected to an upper portion of the positive temperature element 530 and applies a practical current to an external side, and a gasket 550 which encloses lateral circumferences of the safety belt 510, the PCB 520, the positive temperature element 530, and the electrode cap 540, to isolate them from the cylindrical case 400. Here, the electrode cap 540 may be bonded to either the first electrode 315 of the electrode assembly 300 or the second electrode tab 325 thereof. For example, the electrode cap 540 may be bonded to the first electrode tab 315 and may function as part of the same electrode along with the first electrode plate 310, which may be, for example, the positive electrode.

The core member 600 is inserted into the center portion of the wound type electrode assembly 300. The core member 600 prevents the wound type electrode assembly 300 from releasing and loosening, and also prevents the wound type electrode assembly 300 from deforming due to external pressure.

The core member 600 is formed by winding a metal plate into a substantially tubular shape. Further, a cut-groove or slit opening 630 is formed along a longitudinal direction of the core member 600. Both lateral ends of the cut-groove 630 of the core member 600 are bent to face inwards, and the both lateral ends thereof are bent again so that the edges thereof face outwards with respect to the core member 600.

Preferably, but not necessarily, diameters of the core member 600 are smaller at the first and second tube end portions than at the center portion. In other words, the core member 600 may be tapered at the first tube end and the second tube end.

Although not shown, an electrolytic solution is infused into the cylindrical case 400 so that a lithium ion can move between the electrodes. The electrolytic solution functions as a medium for moving lithium (Li) ions generated by an electrochemical reaction that occurs in positive and negative electrode inside a battery during charging/discharging. The electrolytic solution may be a non-aqueous type organic electrolytic solution which is a mixture of a lithium salt and an organic solvent with high purity. Further, the electrolytic solution may be a polymer using a polymer electrolyte, but the type of the electrolytic solution material is not limited thereto.

Figure 3A:
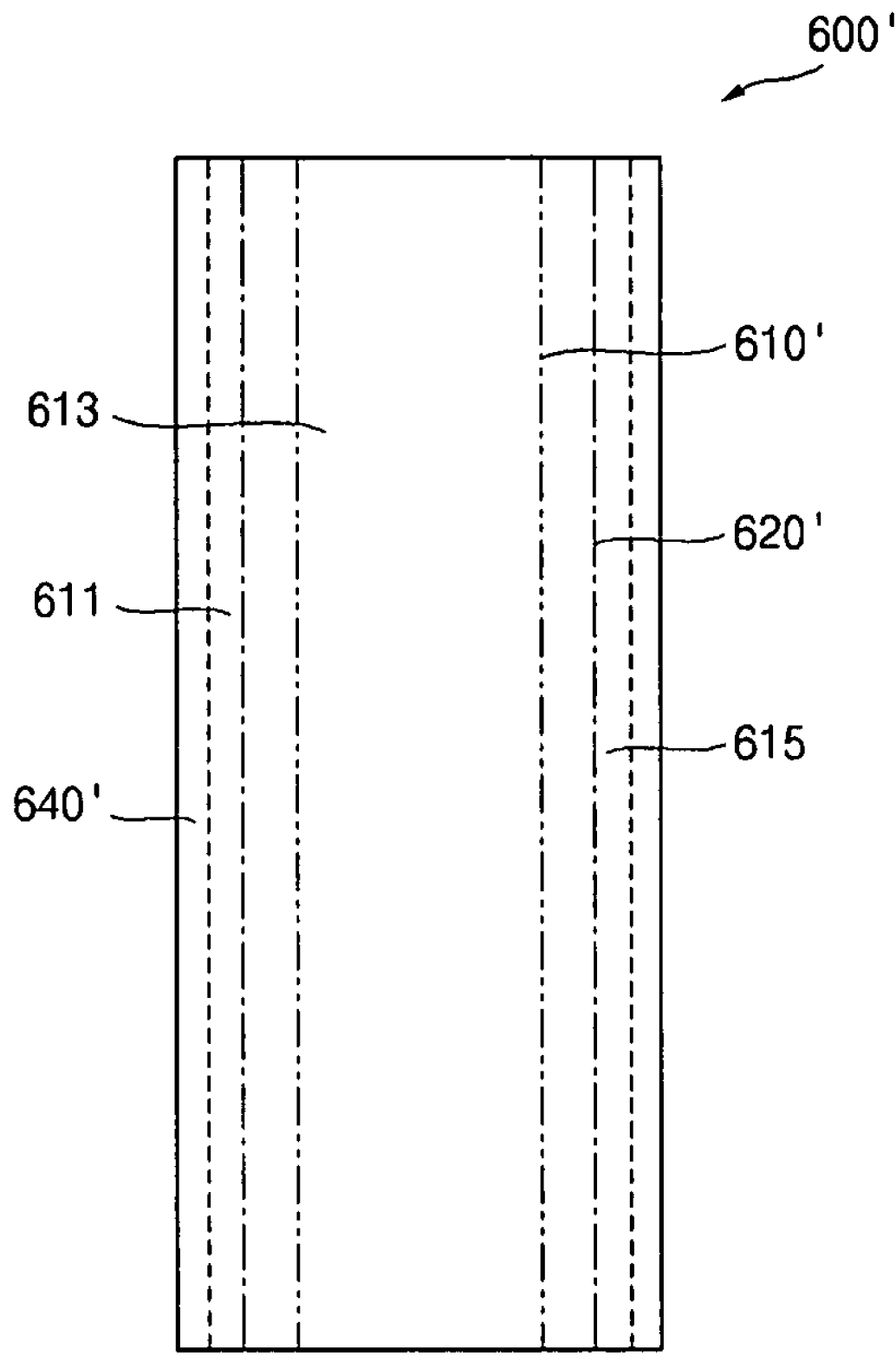
FIG. 3A is a plan view illustrating a core member plate of a cylindrical lithium secondary battery according to an embodiment of the present invention.
Figure 3B:
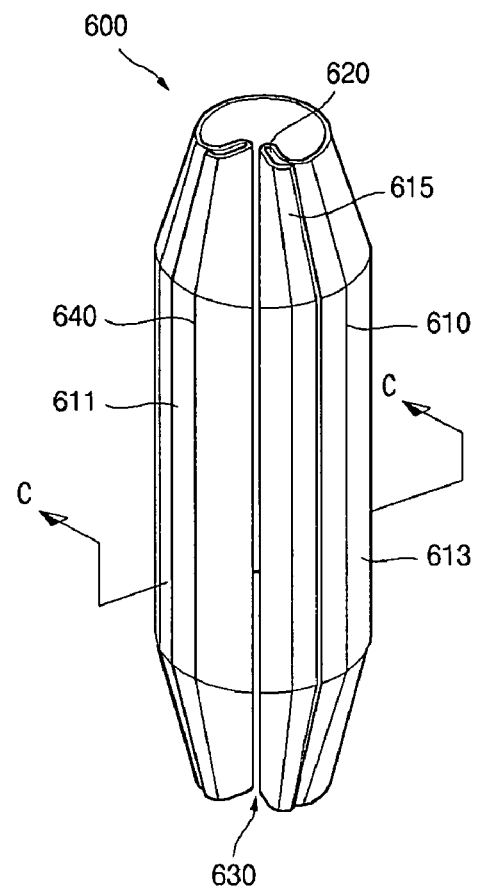
FIG. 3B is a perspective view illustrating a core member of a cylindrical lithium secondary battery according to the embodiment of FIG. 3A.
Figure 3C:
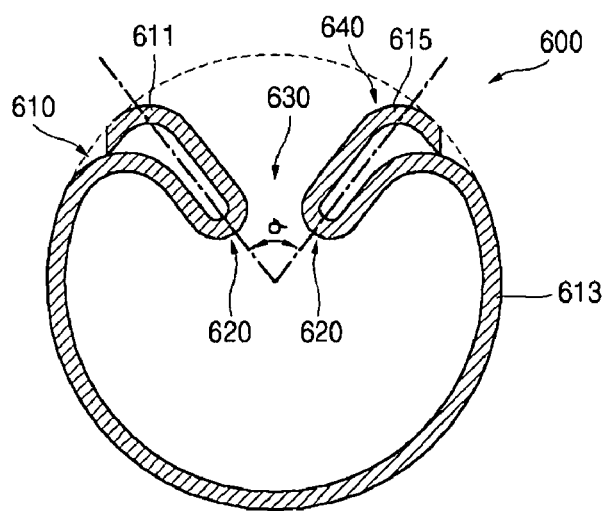
FIG. 3C is a cross-sectional view along the C-C line of FIG. 3B.

FIG. 3A is a plan view illustrating a core member plate of a cylindrical lithium secondary battery according to an embodiment of the present invention. FIG. 3B is a perspective view illustrating a core member of a cylindrical lithium secondary battery according to an embodiment of the present invention. FIG. 3C is a cross-sectional view along the C-C line of FIG. 3B.

Referring first to FIG. 3A, a core member 600 of the cylindrical lithium secondary battery 200 is formed from a core member plate 600' made of a metal plate.

The core member plate 600' includes a pair of first lines 610', a pair of second lines 620', and a pair of third lines 640' at both left and right sides thereof, which are used as bending lines when the core member 600 are formed along a longitudinal direction of the core member plate 600'.

The core member plate 600' is divided by the first lines 610' into left and right lateral end portions 611 and 615 and a body portion 613, and the second lines 620' are located at the left and right lateral end portions 611 and 615.

The third lines 640' may be located outside the left and right lateral end portions 611 and 615 with respect to the second lines 620'.

Referring to FIGS. 3B and 3C, the cylindrical lithium secondary battery 200 is formed by winding the core member plate 600' of FIG. 3A.

The core member 600 has a substantially tubular shape. Further, a cut-groove or gap 630 is formed along a longitudinal direction of the core member 600.

Through a pair of first bending portions 610 which are bent along the first lines 610' at left and right sides of the core member plate 600', that is, symmetrically with respect to the gap 630, the core member 600 is divided into the left and right lateral end portions 611 and 615 and a body portion 613. An arc line extending from the body portion 613 may form an imaginary circumference. The gap 630 is formed because the material of the core member 600 does not extend around an entire circumference to create a closed tube structure, but rather bends inwardly at the left and right lateral end portions 611 and 615, leaving the gap 630 where the left and right lateral end portions 611 and 615 do not meet.

Further, the left and right lateral end portions 611 and 615 may be located inside the imaginary circumference formed by the arc line extending from an outer circumferential surface of the body portion 613.

In addition, edges of the left and right lateral end portions 611 and 615 of the core member 600 may face the arc line extending from the outer circumferential surface of the body portion 613 due to bending of the second bending portions 611 and 615 along the second lines 620'. In other words, the second bending portions 620 may bend the left and right lateral end portions 611 and 615 respectively in a rotation direction opposite to inward rotation direction of the first bending portions 610 so that the left and right lateral end portions 611 and 615 extend toward the imaginary circumference of the core member 600.

In addition, in the left and right lateral end portions 611 and 615, outer portions of the second bending portions 620 are rounded by a pair of third bending portions 640 which are bent along the third lines 640'. In other words, the left and right lateral end portions 611 and 615 are bent in a rotation direction of the second bending portions 610 through the third bending portions 640 located outside the second bending portions 620.

Edges of the left and right lateral end portions 611 and 615 may respectively come in contact with the imaginary arc line extending from the outer circumferential surface of the body portion 613.

Imaginary lines or planes extending from each of the second bending portions 620 of the left and right lateral end portions 611 and 615 pass through an axis of the core member and may form an angle α equal to or less than 120° with respect to each other.

Accordingly, when the core member 600 is deformed due to an external pressure such as a vertical compression, the electrode assembly 300 can be prevented from being damaged by the edges of the left and right lateral end portions 611 and 615 of the core member 600. In particular, a short that may occur inside the electrode assembly 300 when the end portions of a core member damage the separator of the electrode assembly due to the deformation of the core member can be prevented in the core member 600.

Preferably, but not necessarily, diameters of the core member 600 are smaller at the first end portion and second end portion than at the center portion. Namely, the first tube end portion and second tube end portion of the core member 600 may include a tapered portion. The tapered portion prevents the separator 300 from being damaged by the core member 600 when the core member 600 is inserted into the central space of the electrode assembly 300. Because of the tapering, the diameters at first tube end portion and second tube end portion of the core member 600 are smaller than the diameter at the center portion.

In addition, the height of the core member 600 may be about 90 to 110% of the height of the electrode assembly 300 when a tube end portion of the core member is located on the second electrode tab 325. If the height of the core member 600 is equal to or less than 90% of the height of the electrode assembly 300, the core member 600 lacks sufficient strength for fixing and supporting the electrode assembly 300. In addition, if the height is equal to or greater than 110% thereof, the core member 600 may come into contact with elements of the cap assembly 500, thereby creating problems.

Figure 4A:
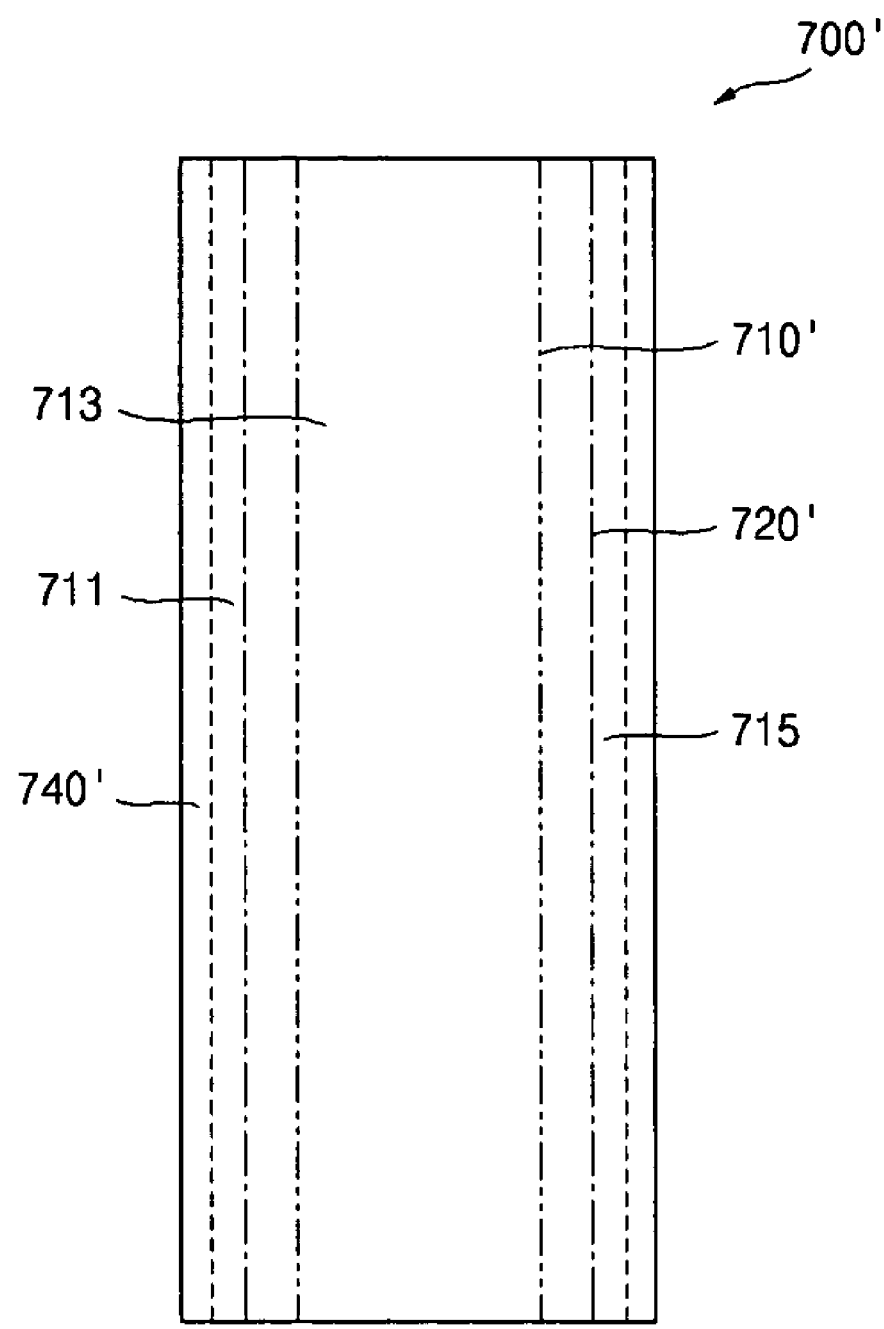
FIG. 4A is a plan view illustrating a core member plate of a cylindrical lithium secondary battery according to another embodiment of the present invention.
Figure 4B:
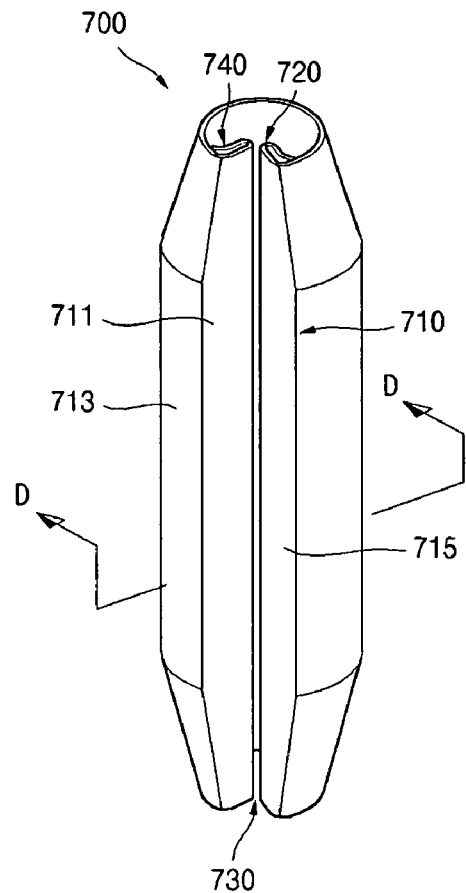
FIG. 4B is a perspective view illustrating a core member of a cylindrical lithium secondary battery according to the embodiment of FIG. 4A.
Figure 4C:
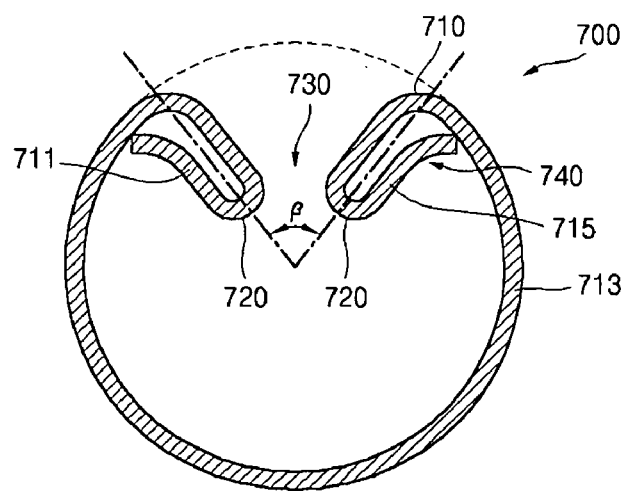
FIG. 4C is a cross-sectional view along the D-D line of FIG. 4B.

Referring to FIGS. 4A to 4C, a core member 700 of the cylindrical lithium secondary battery 200 according to another embodiment of the present invention has a similar structure with the core member 600 according to the embodiment of the present invention shown in FIGS. 3A to 3C. In particular, the core member 700 includes left and right lateral end portions 711 and 715 and a body portion 713. The only difference lies in that left and right lateral end portions 711 and 715 of the core member 700 are bent through a second bending portion 720, and edges of the left and right lateral end portions 711 and 715 face the inner circumferential surface of the core member 700.

More specifically, the core member 700 is formed by winding a core member plate 700' made of a metal plate, and has a substantially tubular shape. Further, a gap 730 is formed along a longitudinal direction of the core member 700.

The left and right lateral end portions 711 and 715 may face inwards of the core member 700 through a pair of first bending portions 710 which are bent inwardly along a first line 710' of the core member plate 700'.

In the left and right lateral end portions 711 and 715 of the core member 700, edges of the left and right lateral end portions 711 and 715 may come in contact with an inner circumferential surface of the core member 700 through a pair of second bending portions 720 which are bent in the same inward rotation direction as the first bending portions 710 along the second line 720'.

In addition, in the left and right lateral end portions 711 and 715, outer portions of the second bending portions 720 are rounded by a pair of third bending portions 740 which are bent in a rotation direction opposite to the rotational direction of the second bending portions 720 along the third lines 740'.

Imaginary lines or planes extending inwardly from each of the second bending portions 720 of the left and right lateral end portions 711 and 715 pass through an axis of the core member and may form an angle β equal to or less than 120° with respect to each other.

As described above, since the cylindrical lithium secondary battery 200 according to embodiments of the present invention includes one of the core members 600 or 700 as shown in FIGS. 3A to 3C or FIGS. 4A to 4C, when the core member 600 or 700 is deformed due to an external pressure such as a vertical compression, the electrode assembly 300 can be prevented from being damaged by edges of the left and right lateral end portions 611 and 615 or 711 and 715 of the core member 600 or core member 700, respectively. In particular, a short that may occur inside an electrode assembly when end portions of a core member damage the separator of an electrode assembly due to the deformation of the core member can be prevented when the core member 600 or the core member 700 is used.

Figure 5A:
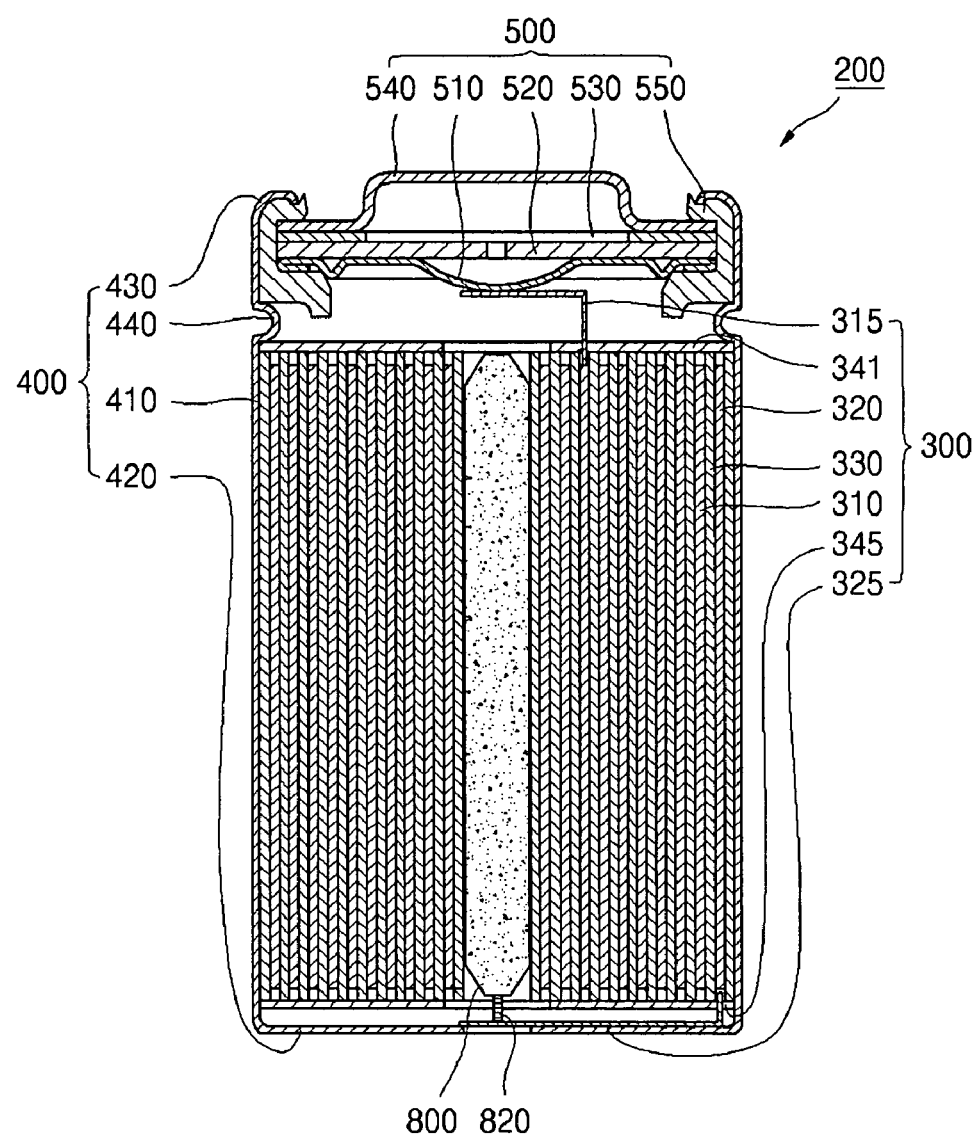
FIG. 5A is a vertical cross-sectional view illustrating a cylindrical lithium secondary battery according to another embodiment of the present invention.
Figure 5B:
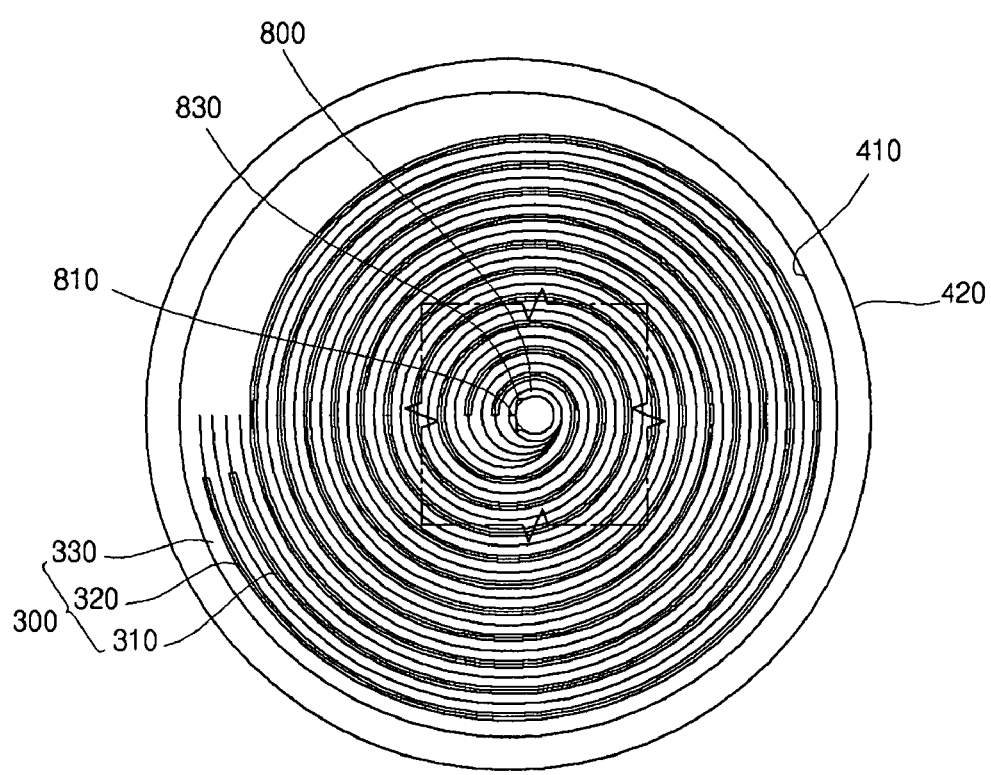
FIG. 5B is a horizontal cross-sectional view illustrating a cylindrical lithium secondary battery according to the embodiment of FIG. 5A.

FIG. 5A is a vertical cross-sectional view illustrating a cylindrical lithium secondary battery according to another embodiment of the present invention. FIG. 5B is a horizontal cross-sectional view illustrating a cylindrical lithium secondary battery according to this embodiment of the present invention.

Overall structures of the cylindrical lithium secondary battery illustrated in FIGS. 5A to 5B are similar to those of the cylindrical lithium secondary battery illustrated in FIGS. 2A to 2C.

The only difference can be seen in the structure of a core member. The core member 800 is inserted into a central space of the wound type electrode assembly 300, prevents the wound type electrode assembly 300 from releasing and loosening, and also prevents the wound type electrode assembly 300 from deforming due to an external pressure. The core member 800 has a substantially tubular shape. A cut-groove 810 is formed along a longitudinal direction of the core member 800. The cut-groove 810 is bonded when the core member 800 is joined with the electrode assembly 300. In some cases, the cut-groove 810 may be separated to maintain a specific distance.

Further, the core member 800 includes a protrusion 820 that protrudes by a specific length at a lower portion of the core member 800, that is, at the tube end portion of the core member 800 that faces the bottom or closed end of the case, and at least one notch 830 is formed at an inner lateral surface of the tube shaped core member 800 along a longitudinal direction of the core member 800.

In addition, the height of the core member 800 is about 90 to 110% of the height of the electrode assembly 300 when a tube end portion of the core member 800 is located on the second electrode tab 325. If the height of the core member 800 is equal to or less than 90% of the height of the electrode assembly 300, the core member 800 lacks sufficient strength for fixing and supporting the electrode assembly 300. In addition, if the height of the core member 800 is equal to or greater than 110% of the height of the electrode assembly 300, the core member 600 may come into contact with an element of the cap assembly 500, thereby creating problems.

Although not shown, an electrolytic solution is infused into the cylindrical case 400 so that lithium ions can move between the electrodes. The electrolytic solution functions as a medium for moving lithium (Li) ions generated by an electrochemical reaction that occurs in positive and negative electrodes inside a battery during charging/discharging. The electrolytic solution may be a non-aqueous type organic electrolytic solution which is a mixture of a lithium salt and an organic solvent with high purity. Further, the electrolytic solution may be a polymer using a polymer electrolyte, but the type of the electrolytic solution material is not limited thereto.

Figure 6A:
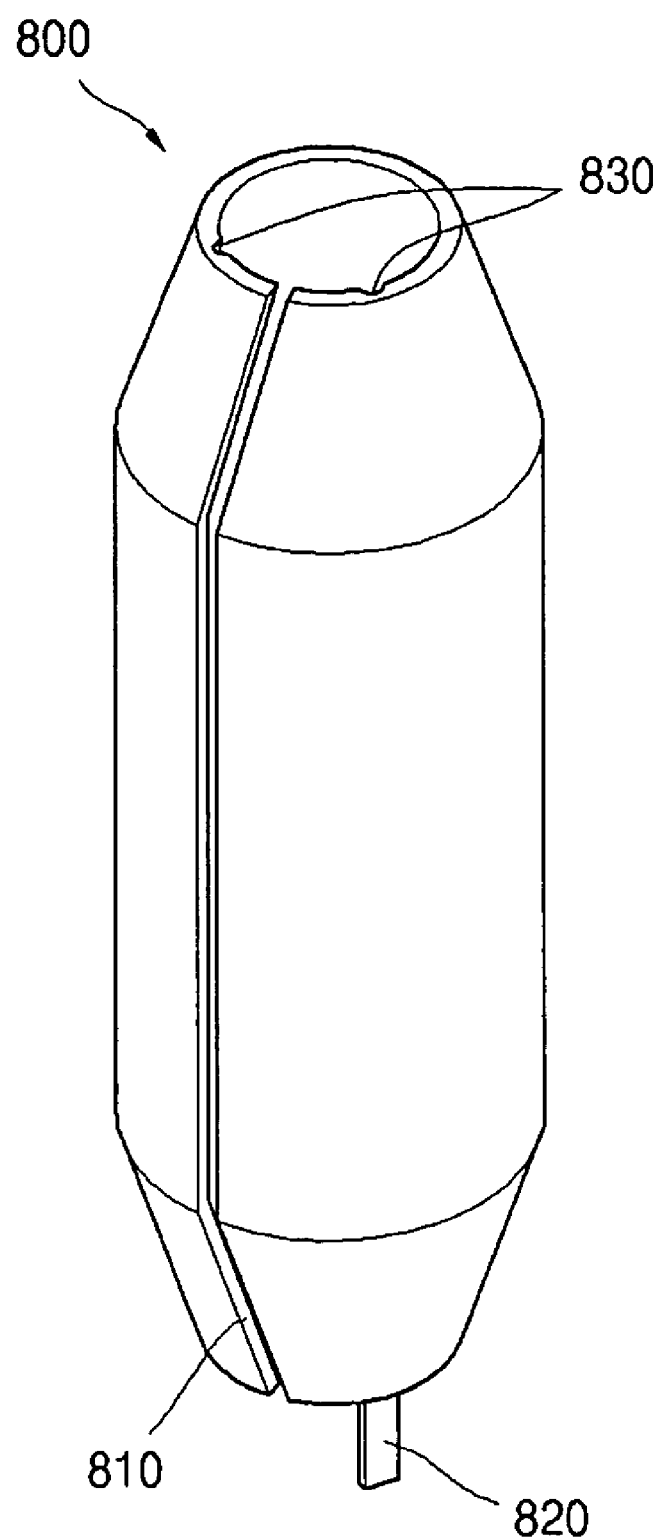
FIGS. 6A and 6B are perspective views illustrating core members of a cylindrical lithium secondary battery according to additional embodiments of the present invention.
Figure 6B:
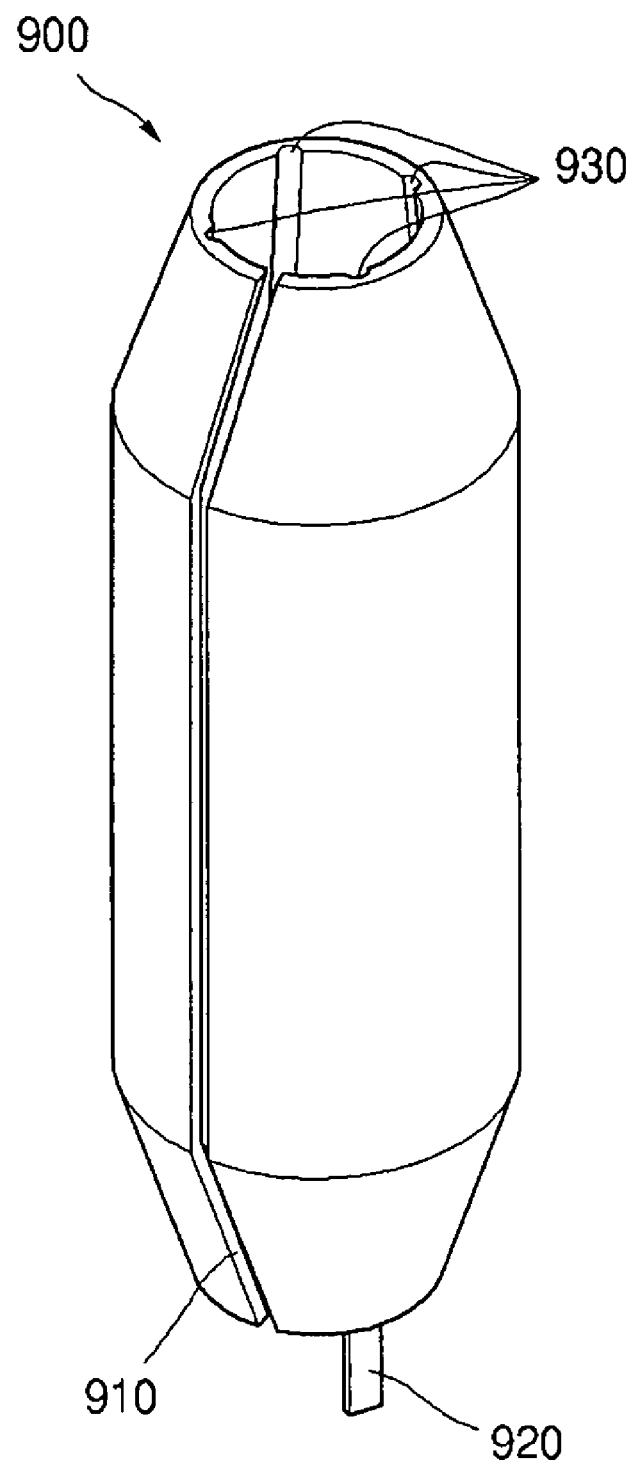

FIGS. 6A and 6B are perspective views illustrating core members of a cylindrical lithium secondary battery according to additional embodiments of the present invention.

Referring to FIGS. 6A and 6B, core members 800 and 900 of the cylindrical lithium secondary battery 200 have a substantially tubular shape, and cut-grooves 810 and 910 are formed along longitudinal directions of the core members 800 and 900. As used herein, the term "cut-groove" refers to any longitudinal gap in the wound core members 800 and 900. The cut-groove may be formed by cutting the core member after it has been formed into a tubular shape, or may be formed by cutting the plate from which the core member is formed so that when the core member is formed, the plate material does not extend in an entire circumference.

The core members 800 and 900 each include a protrusion 820 and 920 that protrudes by a specific length from the lower portion, of the core member 800 or 900. The core members 800 and 900 each have a tubular shape in which diameters at edges of upper and lower portions of the core members 800 and 900 are smaller than diameters at center portions thereof. This prevents lower portions of elements of the electrode assembly 300, for example, the first electrode plate 310, the second electrode plate 320, and the separator 330, from being damaged by the cut-grooves 810 and 910, when the core member 800 and 900 rotate due to an external pressure.

Further, one or more notches 830 and 930 are formed at an inner lateral surface of the tube-shaped core members 800 and 900 along a longitudinal direction of the core members 800 and 900. Through the notches 830 and 930, a deformation direction of the core members 800 and 900 can be predetermined, so that when an external pressure equal to or greater than a specific pressure is applied, the core members 800 and 900 can be deformed in a predetermined direction, and thus a short of the electrode assembly 300 can be prevented which may otherwise occur when the core members 800 and 900 are deformed.

The notches 830 and 930 formed at the inner lateral surface of the core members 800 and 900 may be disposed in various forms.

For example, as shown in FIG. 6A, in an inner lateral surface of the core member 800, the core member 800 may include a pair of notches 830 formed along a longitudinal direction of the core member 800. Here, the notches 830 may be located in a symmetrical manner on left and right sides of the cut-groove 810, and may be located on a circumference with an angle of 45° from left and right sides of the cut-groove 810. In other words, the notches 830 may be located at the left and right sides of the cut-groove 810 at the same distance from the cut-groove.

As shown in FIG. 6B, the core member 900 may include four notches 930 formed along a longitudinal direction of the core member 900 at an inner lateral surface of the core member 900. The four notches 930 may be respectively located in pairs at left and right sides with respect to the cut-groove 910 in a symmetrical manner, and may be located on the circumference of the core member at 45°, 135°, 225°, and 315° with respect to the cut-groove 910. In other words, in the four notches 930 formed on the inner lateral circumferential surface of the core member 800, imaginary lines connecting each adjacent notch may form a trapezoid. In particular, the four notches 930 formed on the circumference of the core member 900 may be located so that the imaginary lines connecting each adjacent notch form a square.

As described above, the cylindrical lithium secondary battery 200 according to these embodiments of the present invention includes the protrusions 820 and 920 at lower portions of the core members 800 and 900 and the notches 830 and 930 formed in a longitudinal direction at the inner lateral surface of the core members 800 and 900, thereby improving the stability of the cylindrical lithium secondary battery 200.

In particular, the protrusions 820 and 920 formed at the lower portions of the core members 800 and 900 may prevent damage to the lower portion of the electrode assembly 300 when the core members 800 and 900 rotate.

Further, when an external pressure equal to or greater than a specific pressure is applied to the core members 800 and 900, the notches 830 and 930 may allow for the core members 800 and 900 to be deformed to a spiral shape in a central direction thereof. Thus, a short of the electrode assembly caused by deformation of the core members 800 and 900 can be prevented.

Figure 7:
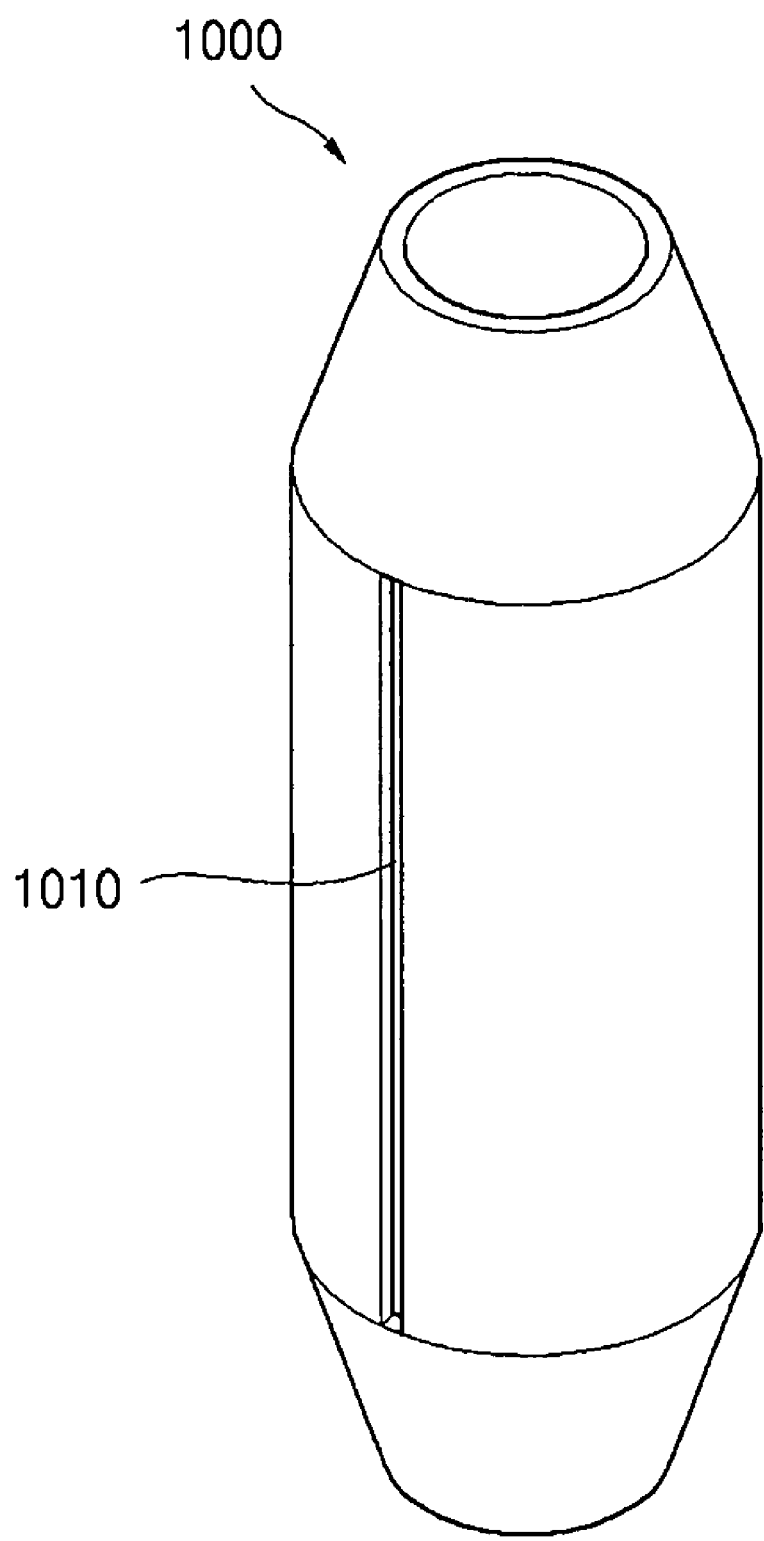
FIG. 7 is a perspective view according to another embodiment of the present invention.

FIG. 7 is a perspective view according to another embodiment of the present invention. Referring to FIG. 7, at least one slot 1010 is formed in a longitudinal direction in a tubular core member 1000. The slot 1010 does not extend to the first and second tube ends of the core member 1000, and in fact, in comparison with the conventional core member 100 of FIG. 1, in the first and second tube ends of the core member 1000 of the present embodiment, are not cut or interrupted by notches, cut-grooves or gaps. Thus, edges of the core member 1000 are less sharp even when the core member 1000 is deformed by an external force, and become more resilient with respect to deformation. By tapering the first and second tube ends of the core member 1000 in the absence of a slot or gap in the tube ends, the electrode assembly is less likely to be damaged by the upper and lower ends of the core member 1000, even when the core member 1000 is deformed.

Accordingly, the present invention provides a cylindrical lithium secondary battery having improved stability with respect to an external pressure.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cylindrical lithium secondary battery comprising:
an electrode assembly which has a first electrode plate, a second electrode plate, and a separator provided between the first electrode plate and the second electrode plate, is wound in a spiral shape, and has a central space at the center of winding;
a core member which is inserted into the central space of the electrode assembly;
a case having a space for containing the electrode assembly; and
a cap assembly which is connected to an open end of the case so as to seal the case,
wherein the core member is formed in a tube shape having a gap along a longitudinal direction, which divides the core member into a body portion and left and right lateral end portions, wherein an imaginary arc line extending from an outer circumferential surface of the body portion of the core member defines an imaginary circumference, and
wherein the left and right lateral end portions are located inside the imaginary circumference and comprise a pair of first bending portions, inwardly bending and symmetrically disposed with respect to the gap, and a pair of second bending portions bending in a rotation direction that is opposite to the inwardly bending rotational directions of the first bending portions.

2. The cylindrical lithium secondary battery according to claim 1
wherein, the left and right lateral end portions further comprise a pair of third bending portions at outer portions of the second bending portions, wherein the third bending portions are bent in the rotation direction of the second bending portions.

3. The cylindrical lithium secondary battery according to claim 2
wherein edges of the left and right lateral end portions are located on the imaginary arc line extending from the outer circumferential surface of the body portion of the core member.

4. The cylindrical lithium secondary battery according to claim 1
wherein imaginary lines extending inwardly from each of the second bending portions of the left and right lateral end portions pass through an axis of the core member and form an angle equal to or less than 120° with respect to each other.

5. The cylindrical lithium secondary battery according to claim 1
wherein the core member is made of a metallic material.

6. The cylindrical lithium secondary battery according to claim 1
wherein diameters at first and second tube end portions of the core member are smaller than a diameter at a center portion.

7. The cylindrical lithium secondary battery according to claim 1
wherein the height of the core member is about 90 to 110% of the height of the electrode assembly.

8. A cylindrical lithium secondary battery comprising:
an electrode assembly which has a first electrode plate, a second electrode plate, and a separator provided between the first electrode plate and the second electrode plate, is wound in a spiral shape, and has a central space at the center of winding;
a core member which is inserted into the central space of the electrode assembly;
a case having a space for containing the electrode assembly; and
a cap assembly which is connected to an open portion of the case so as to seal the case,
wherein the core member is formed in a tube shape having a slit opening along a longitudinal direction, which divides the core member into a body portion and left and right lateral end portions, wherein an imaginary arc line extending from the body portion of the core member defines an imaginary circumference, and
wherein the left and right lateral end portions are located inside the imaginary circumference and comprise a pair of first bending portions, inwardly bending and symmetrically disposed with respect to the slit opening, a pair of second bending portions bending in a rotation direction that is the same as the rotational direction of the first bending portions and a pair of straight portions between the respective first bending portions and second bending portions.

9. The cylindrical lithium secondary battery according to claim 8,
wherein, the left and right lateral end portions further comprise a pair of third bending portions at outer portions of the second bending portions, wherein the third bending portions are bent in a rotation direction opposite to the rotational direction of the second bending portions.

10. The cylindrical lithium secondary battery according to claim 9,
wherein edges of the left and right lateral end portions come in contact with an inner circumferential surface of the body portion.

11. The cylindrical lithium secondary battery according to claim 8,
wherein imaginary lines extending inwardly from each of the second bending portions of the left and right lateral end portions pass through an axis of the core member and form an angle equal to or less than 120° with respect to each other.

12. The cylindrical lithium secondary battery according to claim 8,
wherein the core member is made of a metallic material.

13. The cylindrical lithium secondary battery according to claim 8,
wherein diameters at first and second tube end portions of the core member are smaller than a diameter at a center portion.

14. The cylindrical lithium secondary battery according to claim 8,
wherein the height of the core member is about 90 to 110% of the height of the electrode assembly.

15. A cylindrical lithium secondary battery comprising:
an electrode assembly which has a first electrode plate, a second electrode plate, and a separator provided between the first electrode plate and the second electrode plate, and has a central space at the center of winding;
a core member which is formed in a tube shape first and second end portions and having a cut-groove along a longitudinal direction, and that includes a protrusion that protrudes from the second tube end portion of the core member, and wherein the core member is bonded to the electrode assembly at the central space of the electrode assembly;
a case which has a space for containing the electrode assembly and which comprises an open portion through which the electrode assembly is inserted; and
a cap assembly which is connected to the open portion of the case so as to seal the case.

16. The cylindrical lithium secondary battery according to claim 15,
wherein the core member further comprises at least one notch which is formed in a longitudinal direction at an inner lateral surface of the core member.

17. The cylindrical lithium secondary battery according to claim 16,
wherein the core member comprises two notches, and the two notches are disposed symmetrically with respect to the cut-groove.

18. The cylindrical lithium secondary battery according to claim 16,
wherein the core member comprises four notches, and the four notches are symmetrically located in pairs at left and right sides with respect to the cut-groove.

19. The cylindrical lithium secondary battery according to claim 15,
wherein diameters at the first and second tube end portions of the core member are smaller than a diameter at a center portion.

20. The cylindrical lithium secondary battery according to claim 15, wherein the height of the core member is about 90 to 110% of the height of the electrode assembly.

21. A cylindrical lithium secondary battery comprising:

an electrode assembly which has a first electrode plate, a second electrode plate, and a separator provided between the first electrode plate and the second electrode plate, and has a central space at the center of winding;

a core member which is formed in a tube shape having a cut-groove along a longitudinal direction, and includes at least one notch formed in a longitudinal direction at an inner lateral surface of the tube shape;

a case which has a space for containing the electrode assembly and including an open portion; and a cap assembly which is connected to an open portion of the case so as to seal the case.

22. The cylindrical lithium secondary battery of claim 21, wherein the at least one notch allows the core member to deform in a predetermined direction when an external pressure is applied to the case.

23. The cylindrical lithium secondary battery according to claim 21,
wherein the core member comprises four notches on a circumference, and wherein imaginary lines connecting adjacent notches together form a trapezoid.

24. The cylindrical lithium secondary battery according to claim 23,
wherein, in the four notches formed on an inner lateral circumferential surface of the core member, the imaginary lines connecting adjacent notches form a square.

25. The cylindrical lithium secondary battery according to claim 21,
wherein the core member further comprises a protrusion which is protruded from a lower portion by a specific length.

26. The cylindrical lithium secondary battery according to claim 21,
wherein diameters at upper and lower portions of the core member are smaller than a diameter at a center portion.

27. A cylindrical lithium secondary battery comprising:

an electrode assembly which has a first electrode plate, a second electrode plate, and a separator provided between the first electrode plate and the second electrode plate, and has a specific space at the center of winding;

a core member which is formed in a tube shape having a first tube end portion, a second tube end portion and middle portion and having a slot in the middle portion along a longitudinal direction, wherein the slot does not extend into the first tube end portion or the second tube end portion;

a case which has a space for containing the electrode assembly and that comprises an open end portion; and a cap assembly which is connected to the open end portion of the case so as to seal the case.

* * * * *

UNITED STATES PATENT AND TRADEMARK OFFICE
CERTIFICATE OF CORRECTION

PATENT NO. : 7,655,349 B2
APPLICATION NO. : 11/409031
DATED : February 2, 2010
INVENTOR(S) : Jong Ku Kim et al.

It is certified that error appears in the above-identified patent and that said Letters Patent is hereby corrected as shown below:

Column 11, line 5, insert --,-- after "claim 1"

Column 11, line 12, insert --,-- after "claim 2"

Column 11, line 18, insert --,-- after "claim 1"

Column 11, line 25, insert --,-- after "claim 1"

Column 11, line 28, insert --,-- after "claim 1"

Column 11, line 32, insert --,-- after "claim 1"

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

PATENT NO. : 7,655,349 B2  Page 1 of 1
APPLICATION NO. : 11/409031
DATED : February 2, 2010
INVENTOR(S) : Kim et al.

It is certified that error appears in the above-identified patent and that said Letters Patent is hereby corrected as shown below:

Title Page, should read (*) Notice: Subject to any disclaimers, term of this patent is extended or adjusted under 35 U.S.C. 154(b) by 910 days.

Signed and Sealed this

Twenty-seventh Day of July, 2010

David J. Kappos
*Director of the United States Patent and Trademark Office*